US008307732B2

(12) United States Patent
Kinoshita et al.

(10) Patent No.: US 8,307,732 B2
(45) Date of Patent: Nov. 13, 2012

(54) PARALLEL LINK ROBOT

(75) Inventors: Satoshi Kinoshita, Yamanashi (JP);
Tomoaki Nagayama, Yamanashi (JP);
Masahiro Yamamoto, Yamanashi (JP);
Hidenori Kurebayashi, Yamanashi (JP);
Katsumi Fujimoto, Yamanashi (JP);
Tokitaka Uemura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 312 days.

(21) Appl. No.: 12/837,532

(22) Filed: Jul. 16, 2010

(65) Prior Publication Data
US 2011/0097184 A1    Apr. 28, 2011

(30) Foreign Application Priority Data
Oct. 26, 2009    (JP) .................................. 2009-245365

(51) Int. Cl.
*B25J 9/00* (2006.01)
(52) U.S. Cl. .................... 74/490.01; 74/490.05; 901/19; 901/36
(58) Field of Classification Search ............... 74/490.01, 74/490.03, 490.05; 901/19, 36
See application file for complete search history.

(56) References Cited

U.S. PATENT DOCUMENTS
4,976,582 A    12/1990    Clavel

FOREIGN PATENT DOCUMENTS
| JP | 63-17791 | 2/1988 |
| JP | 01-109094 | 4/1989 |
| JP | 02-041888 | 2/1990 |
| JP | 02-048192 | 2/1990 |
| JP | 03-202292 | 9/1991 |
| JP | 4045310 B | 7/1992 |
| JP | 09-136286 | 5/1997 |
| JP | 09-272094 | 10/1997 |
| JP | 10-094985 | 4/1998 |
| JP | 11-277478 | 10/1999 |
| JP | 2002532269 A | 10/2002 |
| JP | 2003-175485 | 6/2003 |
| JP | 2007-512968 | 5/2007 |
| WO | 00/35640 A | 6/2000 |
| WO | 2005/053914 A1 | 6/2005 |

OTHER PUBLICATIONS
Office Action for corresponding Japanese Patent Application No. 2009-245365, dated Oct. 6, 2010.

*Primary Examiner* — William C Joyce
(74) *Attorney, Agent, or Firm* — Lowe Hauptman Ham & Berner LLP

(57) ABSTRACT

A parallel link robot (10) provided with a base (11), a moving part (12), three links (20a to 20c) coupling the base and the moving part and having respectively single degrees of freedom with respect to the base, and three actuators (13a to 13c) respectively driving the links, each of the links comprised of a drive link (21a to 21c) coupled with the base and two driven links (22a to 22c, 23a to 23c) coupling the drive link and the moving part and parallel to each other, and further provided with a posture changing mechanism (15) which changes a posture of an element (19) attached to the moving part, an additional actuator (13d to 13f) arranged between the two driven links of at least one link in parallel to these driven links, and a power transmission shaft (39) which extends coaxially from the additional actuator and transmits rotational drive force to the posture changing mechanism. Due to this, it is possible to increase the degrees of freedom without reducing the possible region of operation and the acceleration/deceleration performance.

8 Claims, 14 Drawing Sheets

PARALLEL LINK ROBOT

RELATED APPLICATIONS

The present application is based on, and claims priority from, Japanese Application Number 2009-245365, filed Oct. 26, 2009, the disclosure of which is hereby incorporated by reference herein in its entirety.

BACKGROUND OF THE INVENTION

1. Field of the Invention

The present invention relates to a parallel link robot using a delta type parallel link mechanism for positioning a mounting member equipped with an end effector three-dimensionally.

2. Description of the Related Art

FIG. 11 is a perspective view of a parallel link robot in the prior art. As shown in FIG. 11, the parallel link robot 100 of the prior art mainly includes a base 110, a movable plate 120, and three links 200a to 200c coupling the base 110 and movable plate 120. Note that, the movable plate 120 is provided with a mounting member 190 for a not shown end effector.

As can be seen from FIG. 11, the link 200a is comprised of a drive link 210a extending from the base 110 and two driven links 220a, 230a extending from the movable plate 120. These are coupled with each other by spherical bearings. Further, the base 110 includes an actuator 130a driving the drive link 210a. Note that, the other links 200b, 200c are similarly configured. By separately controlling the actuators 130a to 130c of these links 200a to 200c, it is possible to make the movable plate 120 move by three degrees of freedom (first axis to third axis) and position it at a desired position.

As shown in FIG. 12, in recent years, a parallel link robot 100 further increasing by one the degrees of freedom over the configuration shown in FIG. 11 has been spreading. The parallel link robot 100 such as shown in FIG. 12 is also disclosed in Japanese Examined Patent Publication (Kokoku) No. 4-45310 and International Publication of Translated Version No. 2002-532269. Note that, in FIG. 12 and the later explained FIG. 13, for simplification, the actuators 130a to 130c are omitted.

In FIG. 12, an additional actuator 130d for a fourth axis is arranged on the base 110. Further, an additional link 200d couples the actuator 130d and movable plate 120. As shown in FIG. 12, the link 200d includes a drive shaft 250 coupled by a universal joint. The base 110 and movable plate 120 change in relative positions, so the drive shaft 250 is configured extendably. Therefore, even when the base 110 and the movable plate 120 change in relative positions, the link 200d can track this and therefore the mounting member 190 can be made to turn about the fourth axis in the arrow direction of FIG. 12.

FIG. 13 is a schematic view of a parallel link robot in the prior art increasing by a further one the degrees of freedom over the configuration shown in FIG. 11 and is disclosed in U.S. Pat. No. 4,976,582. In FIG. 13, the additional actuator 130d is directly arranged on the movable plate 120. For this reason, the mounting member 190 coupled with the movable plate 120 can be easily made to turn in the arrow direction about the fourth axis.

However, in the configuration shown in FIG. 12, there are limits to the extendable length of the drive shaft 250. As can be seen from FIG. 12, the drive shaft 250 is comprised of a cylinder and rod. Usually, the shortest length of the drive shaft 250 is the longer of the cylinder and the rod, while the longest length of the drive shaft 250 is the total of the lengths of the cylinder and rod. Therefore, the possible range of operation of the movable plate 120 is limited to one between the longest length and shortest length of the drive shaft 250.

FIG. 14 is a partial enlarged view of a parallel link robot in the prior art. As shown in FIG. 14, the rod of the drive shaft 250 is included in a link 200d through a universal joint 251. However, the universal joint 251 interferes with other parts as the bending angle α shown in FIG. 14 becomes larger (see part enclosed by one-dot chain line in FIG. 14). From this, the possible range of operation of the movable plate 120 is also limited by the bending angle at the universal joint 251.

Furthermore, in the configuration shown in FIG. 13, the actuator 130d is relatively heavy, so the movable plate 120 is remarkably limited in acceleration/deceleration performance. For example, when the end effector of the parallel link robot 100 engages in simple reciprocating motion, the limited acceleration/deceleration performance results in the number of reciprocating operations per unit time decreasing and therefore the processing ability falling.

Further, in the case of use in an environment where the movable plate 120 is exposed to an acid or other corrosive solution, the actuator 130d may be splashed with the corrosive solution. In such a case, the actuator 130d will malfunction and the degrees of freedom of the mounting member 190 will be reduced by one. For this reason, at least the actuator 130d and its wiring have to be suitably protected by a protective cover (not shown) etc.

In the case of the configuration shown in FIG. 12 and FIG. 13, due to the dimensions of the drive shaft 250 or space for arrangement of the actuator 130d, increasing by one the degrees of freedom is the limit. This type of parallel link robot 100 is currently available on the market.

In this regard, FIG. 15A and FIG. 15B are perspective views of parallel link robots increasing by a further two or three the degrees of freedom compared with the parallel link robot shown in FIG. 11. In FIG. 15A, the mounting member 190 of the end effector is rotatably attached through an intermediate member 160 to the movable plate 120. Furthermore, in FIG. 15B, the mounting member 190 is rotatably attached through two intermediate members 160, 170 to the movable plate 120.

However, addition of such intermediate members 160, 170, as shown in FIG. 13, means that, when placing the additional actuator 130d on the movable plate 120, due to their weight, the acceleration/deceleration performance of the movable plate 120 will be further limited. Further, as shown in FIG. 12, when using an extendable drive shaft, an extendable additional drive shaft is required for increasing the degrees of freedom. Due to the physical dimensions of the intermediate members 160, 170, this leads to further limitation of the possible region of operation of the movable plate 120. For this reason, while increasing by a further two or three the degrees of freedom of the parallel link robot shown in FIG. 11 is theoretically possible, practical realization is difficult.

FIG. 16A is a perspective view of another parallel link robot in the prior art, while FIG. 16B is a partial cross-sectional view of the parallel link robot shown in FIG. 16A. In these FIG. 16A and FIG. 16B, the additional actuator 130d is arranged on the movable plate 120. Further, the mounting member 190 has a suction pad 780 attached to it as an end effector.

As shown in FIG. 16A and FIG. 16B, a suction air tube 790 for giving suction force to the suction pad 780 is coupled through a rotation absorption unit 800 to the suction pad 780. The rotation absorption unit 800 can freely rotate and thereby performs the function of preventing the suction air tube 790 from becoming wound around other members when driving the additional actuator 130*d* etc.

However, the rotation absorption unit 800 is arranged between the suction pad 780 and the mounting member 190, so the distance between the mounting member 190 and the suction pad 780 has to be made longer. For this reason, in the prior art, there was the problem that the suction pad 780 became larger in size and more easily interfered with the workpiece W. Further, when using an end effector which cannot mount a rotation absorption unit 800 or when an electrical cable for the end effector is necessary, when driving the additional actuator 130*d* etc., there was also the problem that the piping relating to the end effector, for example, the air tubes, or wiring, for example, the electrical cables, would become wound around other members.

The present invention was made in view of this situation and has as its object the provision of a parallel link robot designed to increase the degrees of freedom without narrowing the possible region of operation and without lowering the acceleration/deceleration performance.

SUMMARY OF THE INVENTION

To achieve the above-mentioned object, according to a first aspect of the invention, there is provided a parallel link robot provided with a base, a moving part, three links coupling the base and the moving part and having respectively single degrees of freedom with respect to the base, and three actuators respectively driving the links, each of the links comprised of a drive link coupled with the base and two driven links coupling the drive link and the moving part and parallel to each other, the parallel link robot further provided with a posture changing mechanism which changes a posture of an element attached to the moving part, an additional actuator arranged between the two driven links of at least one link in parallel to these driven links, and a power transmission shaft which extends coaxially from the additional actuator and transmits rotational drive force of the additional actuator to the posture changing mechanism.

According to a second aspect of the invention, there is provided a parallel link robot provided with a base, a moving part, three links coupling the base and the moving part and having respectively single degrees of freedom with respect to the base, and three actuators respectively driving the links, each of the links comprised of a drive link coupled with the base and two driven links coupling the drive link and the moving part and parallel to each other, the parallel link robot further provided with a posture changing mechanism which changes a posture of an element attached to the moving part, an additional actuator arranged between the two driven links of one link in parallel to these driven links, and a power transmission shaft which extends coaxially from the additional actuator and transmits rotational drive force of the additional actuator to the posture changing mechanism, the posture changing mechanism formed with a through hole running from its top surface to its bottom surface.

According to a third aspect of the invention, there is provided the first or second aspect of the invention wherein at least part of the power transmission shaft includes an inside tube provided with a key and an outside tube formed with a key groove corresponding to the key.

According to a fourth aspect of the invention, there is provided the first or second aspect of the invention wherein at least part of the power transmission shaft includes an inside tube provided with a spline shaft and an outside tube formed with a spline hole corresponding to the spline shaft.

According to a fifth aspect of the invention, there is provided the first or second aspect of the invention wherein the additional actuator is arranged adjacent to the drive link.

These and other objects, features and advantages of the present invention will be more apparent in light of the detailed description of exemplary embodiments thereof as illustrated by the drawings.

BRIEF DESCRIPTION OF THE DRAWING

FIG. 4A is a first schematic view for explaining the operation of driven links when the movable plate moves, while

FIG. 9A is a perspective view of a parallel link robot in another embodiment of the present invention, while

FIG. 10A is a perspective view of a parallel link robot in still another embodiment of the present invention, while

FIG. 15A is a perspective view of a parallel link robot further increasing by two the degrees of freedom compared with the configuration shown in FIG. 11, while FIG. 16A is another perspective view of a parallel link robot in the prior art, while

DETAILED DESCRIPTION

Figure 1:
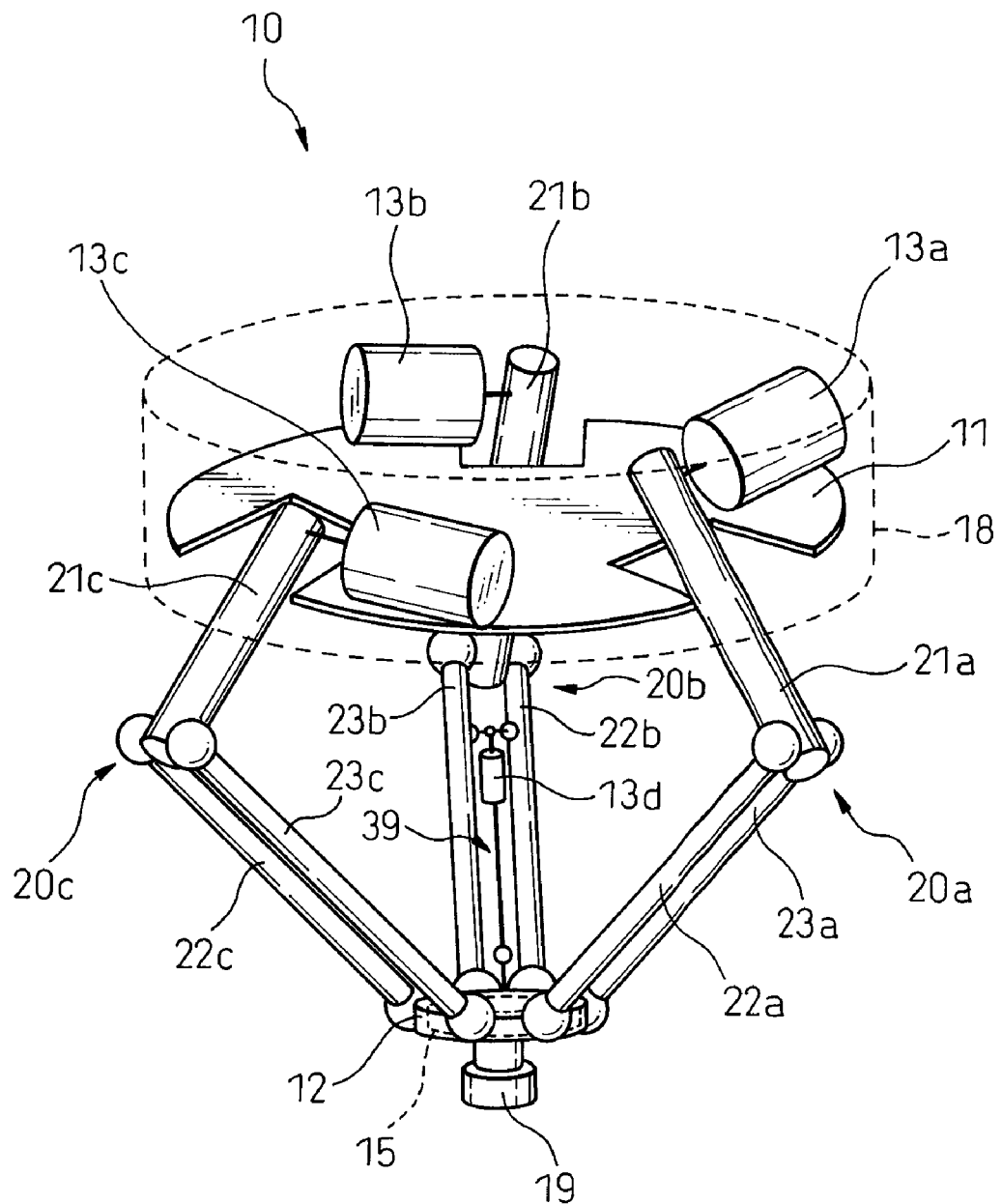
FIG. 1 is a perspective view of a parallel link robot in a typical embodiment based on the present invention.

Below, embodiments of the present invention will be explained with reference to the attached drawings. In the following drawings, similar members are assigned similar reference numerals. To facilitate understanding, these drawings are suitably changed in scale.

FIG. 1 is a perspective view of a parallel link robot in a typical embodiment based on the present invention. In FIG. 1, the parallel link robot 10 mainly includes a base 11 contained in a housing 18, a movable plate 12, and three links 20a to 20c coupling the base 11 and movable plate 12. At the bottom surface of the movable plate 12, a mounting member 19 is provided. A not shown end effector is attached to the mounting member 19.

Figure 2:
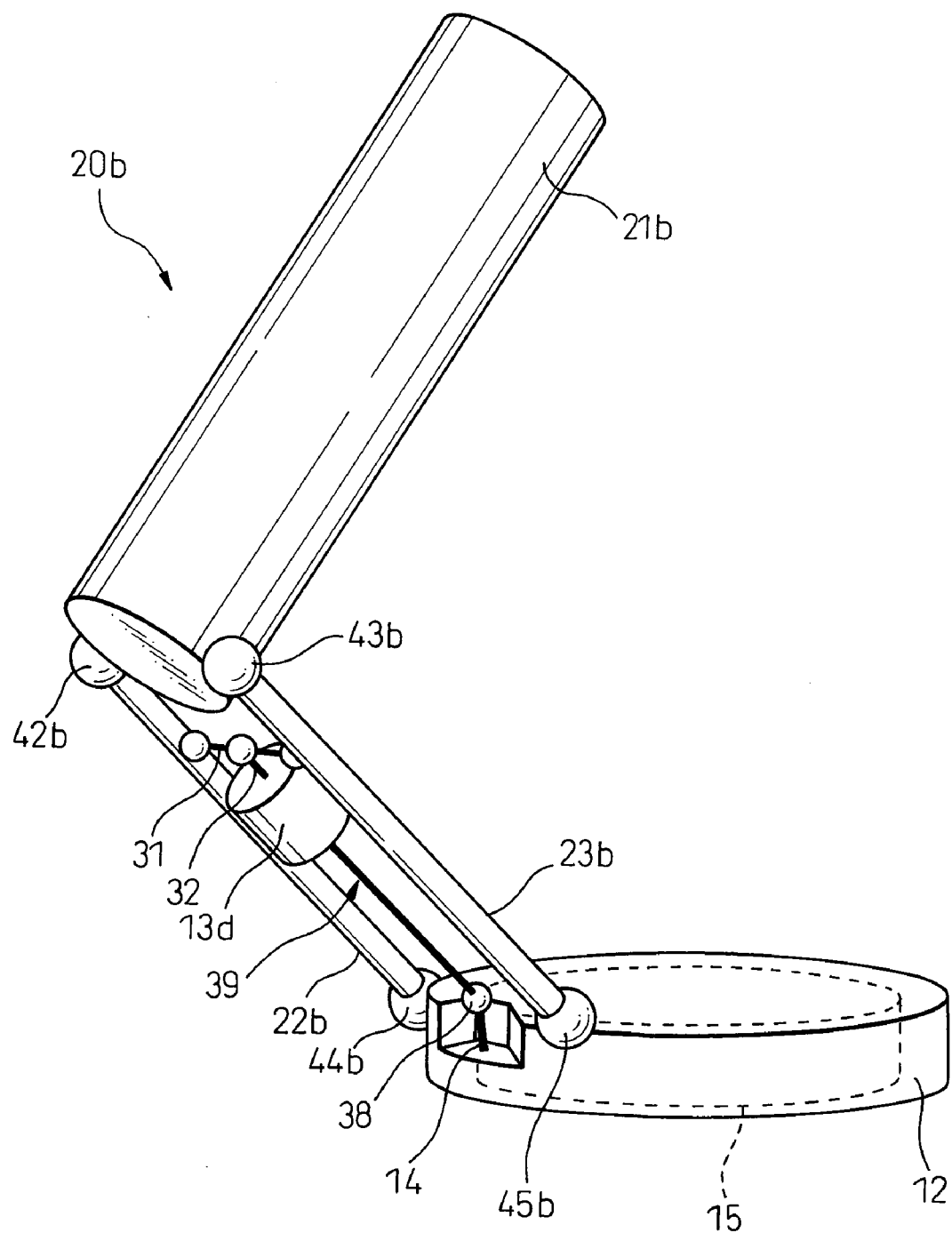
FIG. 2 is a partial perspective view of the parallel link robot shown in FIG. 1.

FIG. 2 is a partial perspective view of the parallel link robot shown in FIG. 1. As shown in FIG. 2, the link 20b is comprised of a drive link 21b and two driven links 22b, 23b extending from the movable plate 12. These are coupled together by spherical bearings 42b, 43b. Further, the front ends of the driven links 22b, 23b are coupled by spherical bearings 44b, 45b to the movable plate 12. These spherical bearings 42b to 45b are arranged so that the rectangular shape formed by these spherical bearings as vertices becomes a parallel quadrilateral shape. In FIG. 1, the drive link 21b extending from the base 11 is connected to the actuator 13b driving the drive link 21b. This actuator 13b is placed on the base 11.

The other links 20a, 20c are configured in the same way as the link 20b, so a detailed explanation will be omitted. Further, as can be seen from the figure, the parallel link robot 10 of the present invention is a delta type. Further, by individually controlling the actuators 13a to 13c of the links 20a to 20c, it is possible to position the mounting member 19 coupled with the movable plate 12 by three degrees of freedom at the desired positions relative to the first axis to third axis.

Referring again to FIG. 2, an auxiliary link 31 is connected through bearings to the two driven links 22b, 23b. Furthermore, at the shaft 32 extending from the center part of the auxiliary link 31 through the bearing, an additional actuator 13d is attached. As illustrated, the output shaft of the additional actuator 13d faces the movable plate 12.

As shown in FIG. 2, the power transmission shaft 39 extending from the output shaft of the additional actuator 13d extends between the two driven links 22b, 23b in parallel to these driven links 22b, 23b. Furthermore, the power transmission shaft 39 is connected to a shaft 14 extending from the posture changing mechanism 15 through a universal joint 38. Note that, the universal joint 38 is preferably positioned on a line segment connecting the two spherical bearings 44b, 45b.

The posture changing mechanism 15 performs the function of changing the posture of the mounting member 19 and thereby can change the posture of the end effector. Note that, the posture changing mechanism 15 is partially included in the movable plate 12. Alternatively, the entire posture changing mechanism 15 may be positioned between the movable plate 12 and the mounting member 19.

Note that, as can be seen from FIG. 2, the auxiliary link 31 and additional actuator 13d are preferably adjacent to the drive link 21b. In this case, the additional actuator 13d is positioned far from the movable plate 12. Therefore, even in an environment in which corrosive solution will splash on the movable plate 12, the need for protecting the additional actuator 13d can be reduced further.

Figure 3:
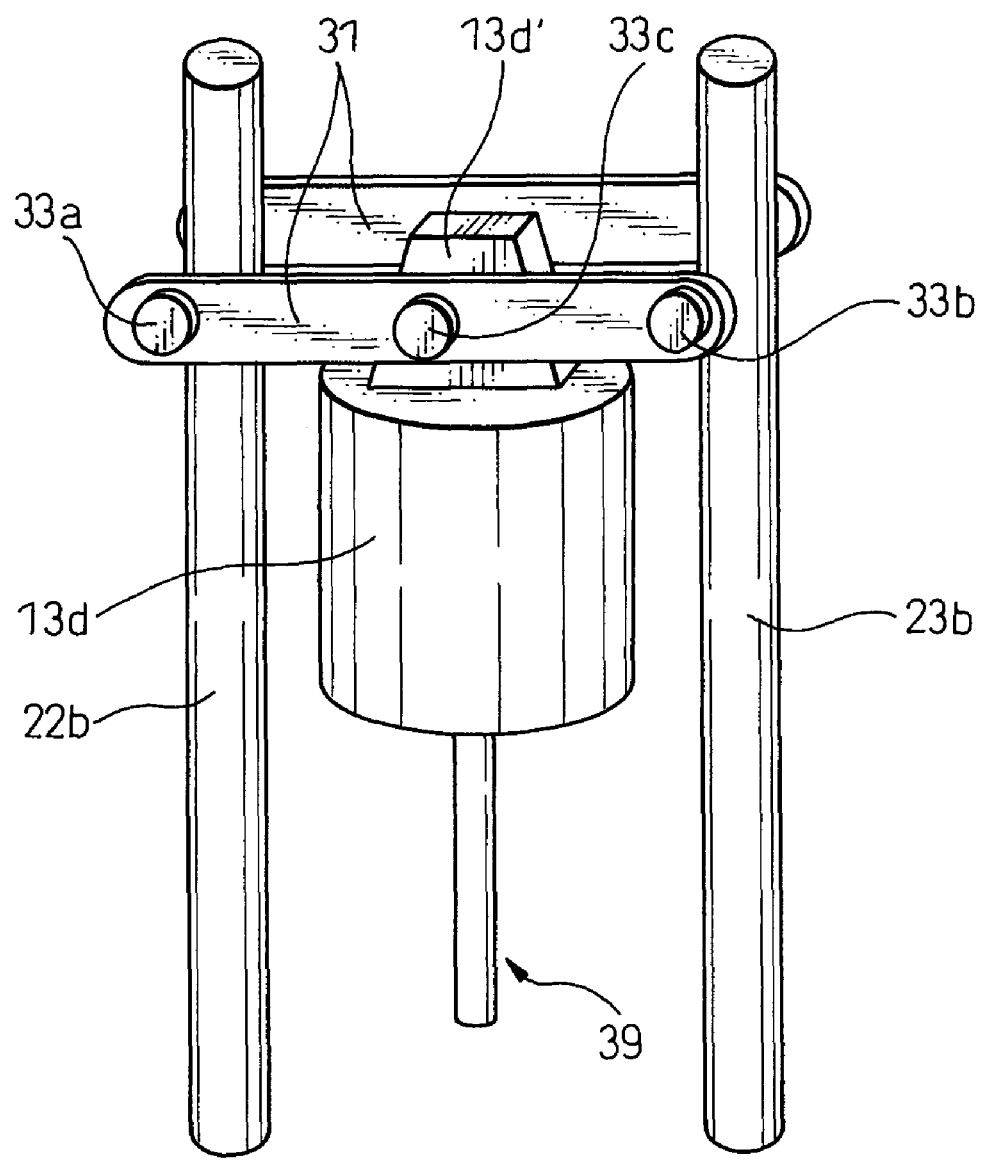
FIG. 3 is an enlarged view of auxiliary links in a certain embodiment.

FIG. 3 is an enlarged view of auxiliary links in a certain embodiment. In FIG. 3, two auxiliary links 31 are coupled with rods 33a, 33b passing through the driven links 22b, 23b in a rotatable manner. Further, the additional actuator 13d is provided with a projecting part 13d' sticking out from its end. Further, at the center of the auxiliary links 31, a rod 33c passes through a hole of the projecting part 13d' and the two auxiliary links 31. Due to such a configuration, the projecting part 13d can pivot about the rod 33c.

Figure 4A:
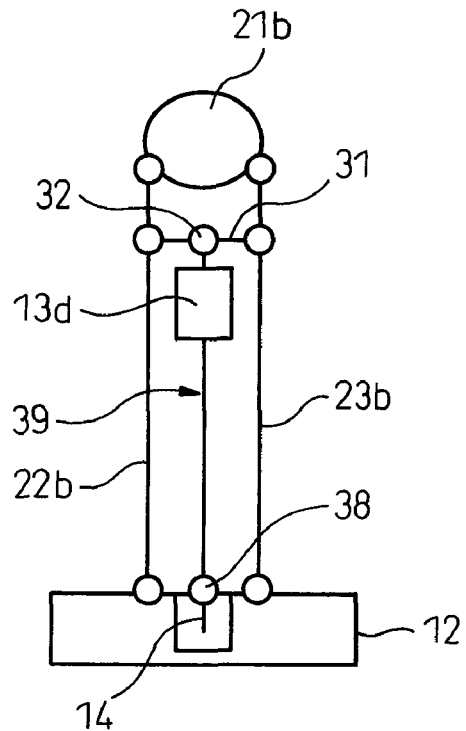
Figure 4B:
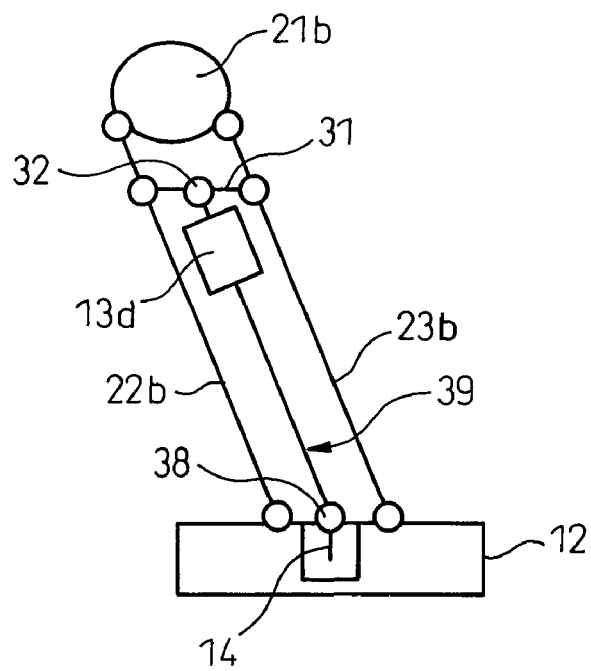
FIG. 4B is a second schematic view for explaining the operation of driven links when the movable plate moves.

FIG. 4A and FIG. 4B are schematic views for explaining the operation of the driven links when the movable plate moves. FIG. 4A shows the time of non-operation, while FIG. 4B shows the time of operation. As can be seen from these drawings, even if the movable plate 12 moves, the two driven links 22b, 23b are parallel to each other. Further, the power transmission shaft 39 of the additional actuator 13d maintains a parallel relationship with the two driven links 22b, 23b. That is, the two driven links 22b, 23b and power transmission shaft 39 are constantly parallel to each other. Further, their lengths do not change. Therefore, in the present invention, the power transmission shaft 39 does not have to be an extendable structure.

Figure 5:
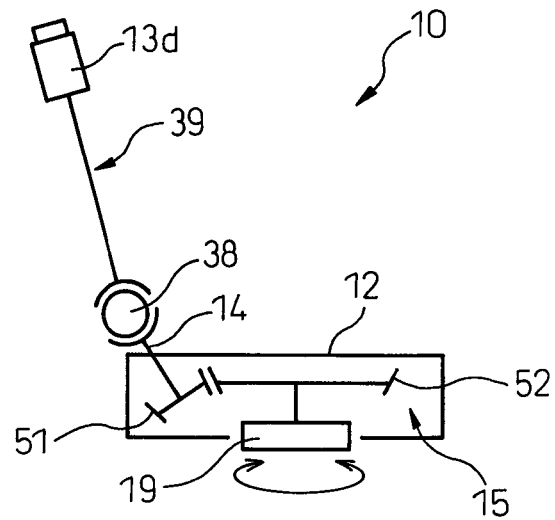
FIG. 5 is a schematic view of a posture changing mechanism transmitting rotational drive force input to the movable plate to the mounting member when further increasing by one the degrees of freedom compared with the configuration shown in FIG. 11.
Figure 11:
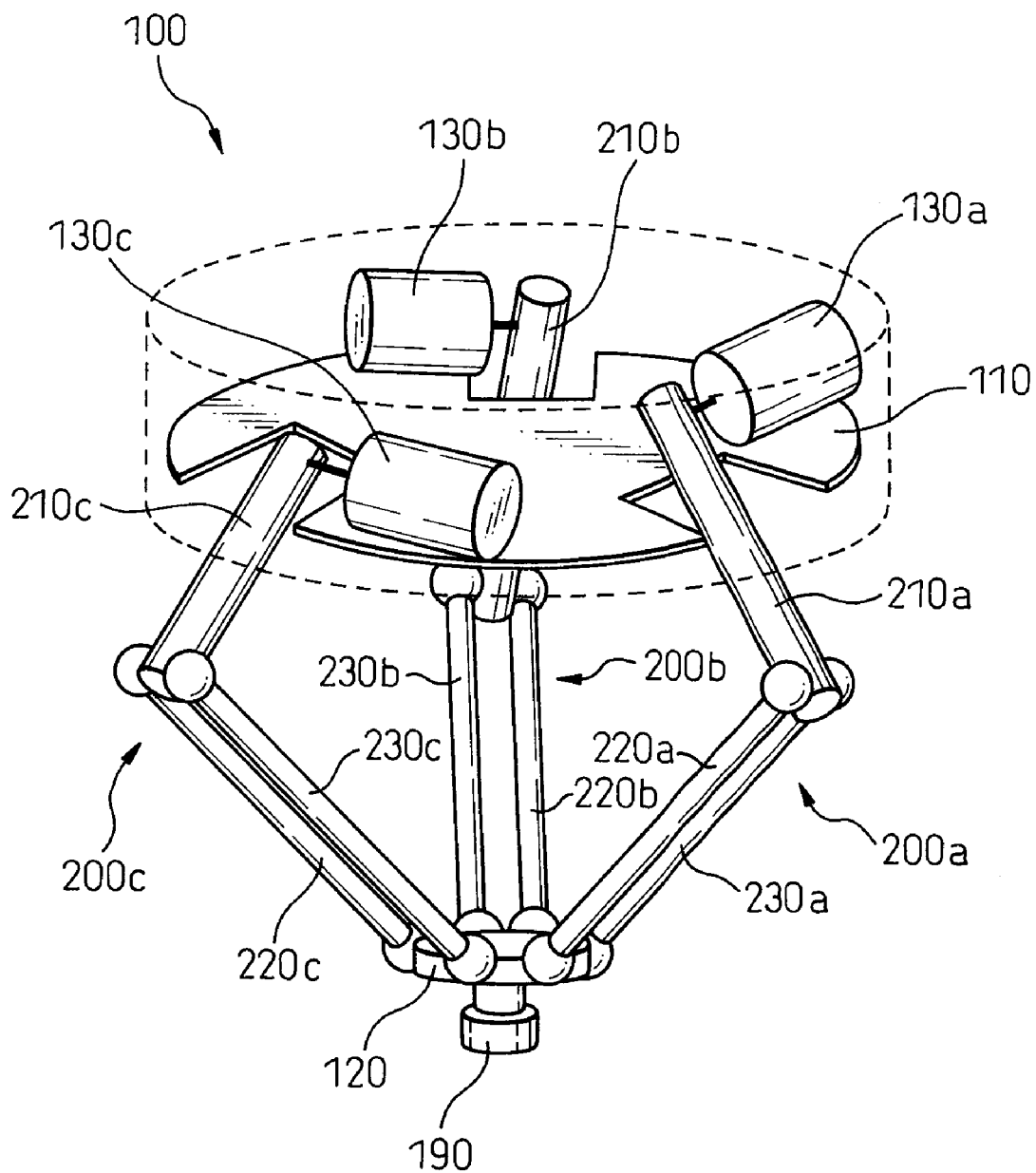
FIG. 11 is a perspective view of a parallel link robot in the prior art.
Figure 12:
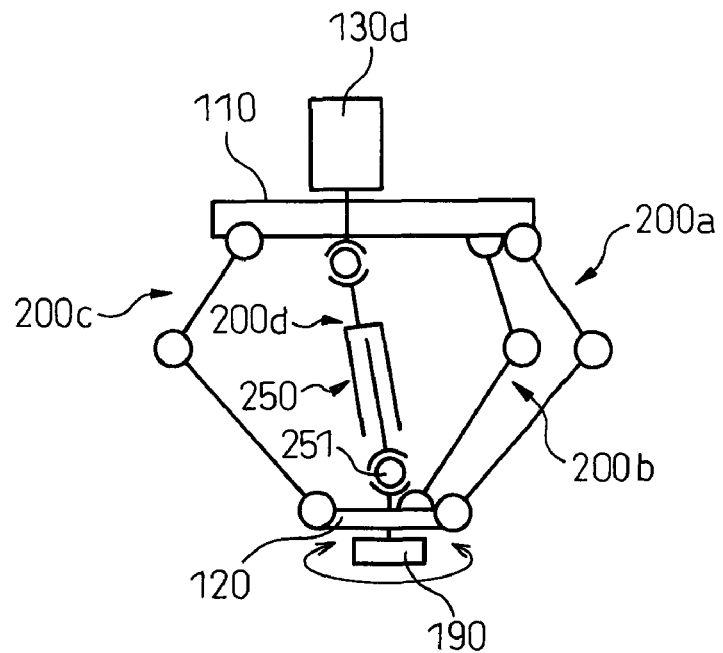
FIG. 12 is a first schematic view of a parallel link robot in the prior art further increasing by one the degrees of freedom compared with the configuration shown in FIG. 11.
Figure 13:
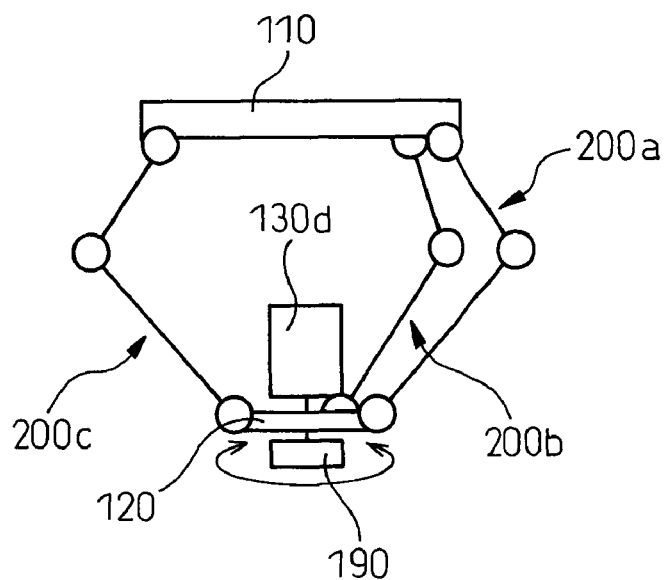
FIG. 13 is a second schematic view of a parallel link robot in the prior art further increasing by one the degrees of freedom compared with the configuration shown in FIG. 11.
Figure 14:
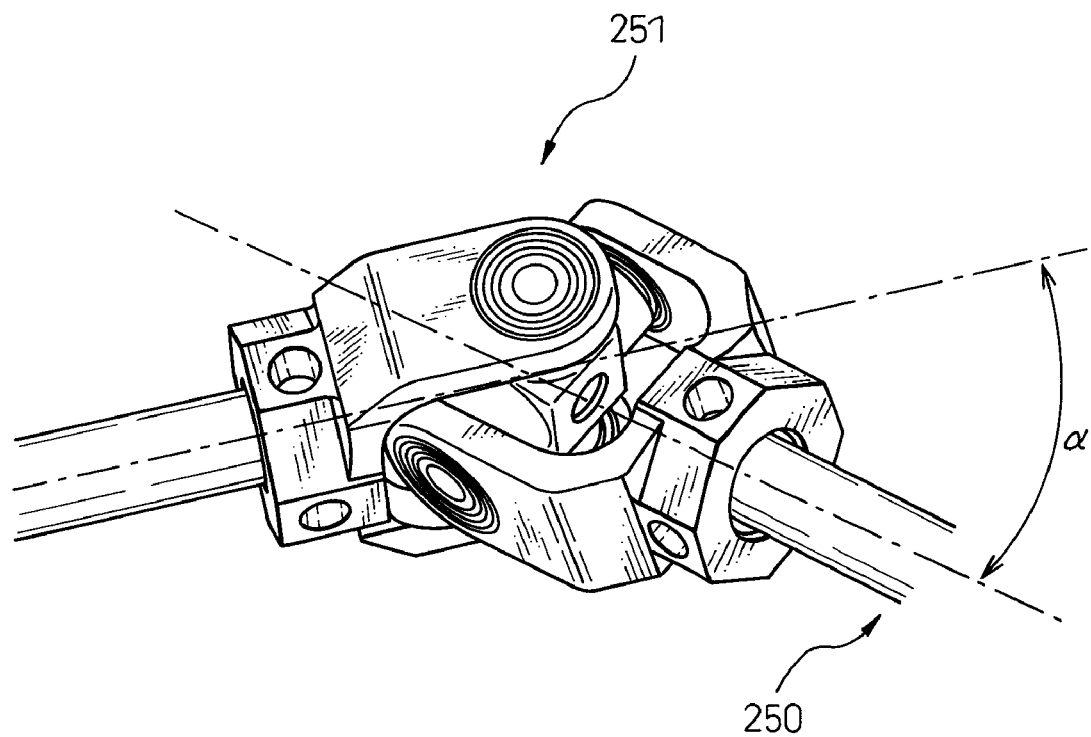
FIG. 14 is a partial enlarged view of a parallel link robot in the prior art.
Figure 15A:
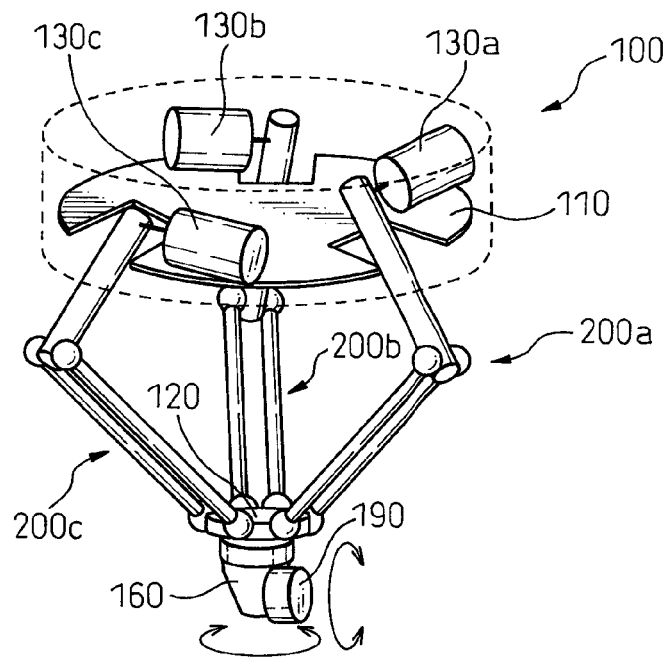
Figure 15B:
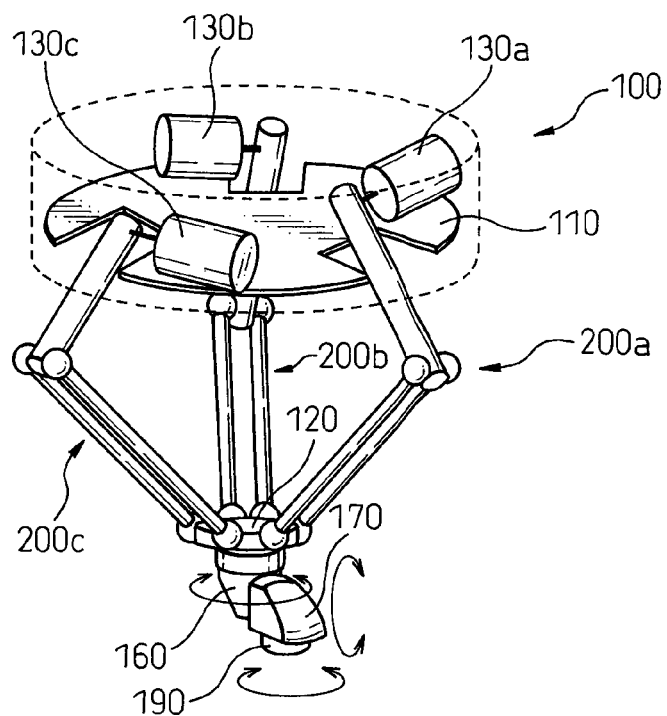
FIG. 15B is a perspective view of a parallel link robot further increasing by three the degrees of freedom compared with the configuration shown in FIG. 11.
Figure 16A:
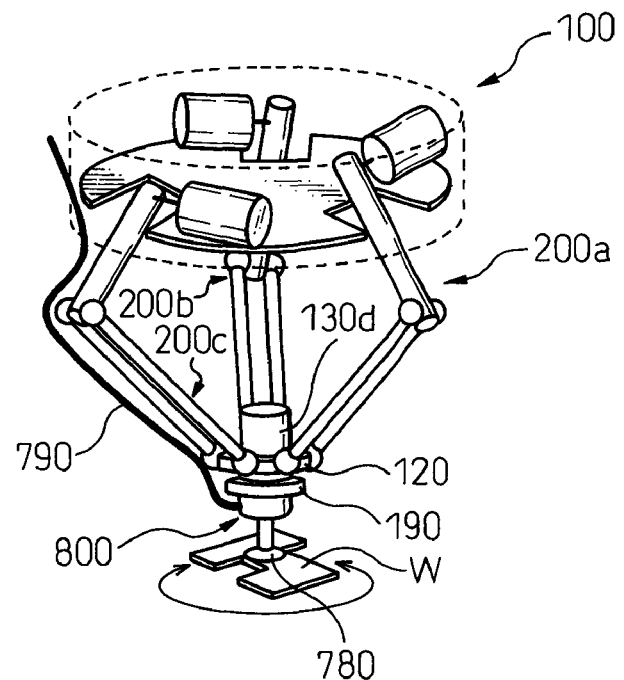
Figure 16B:
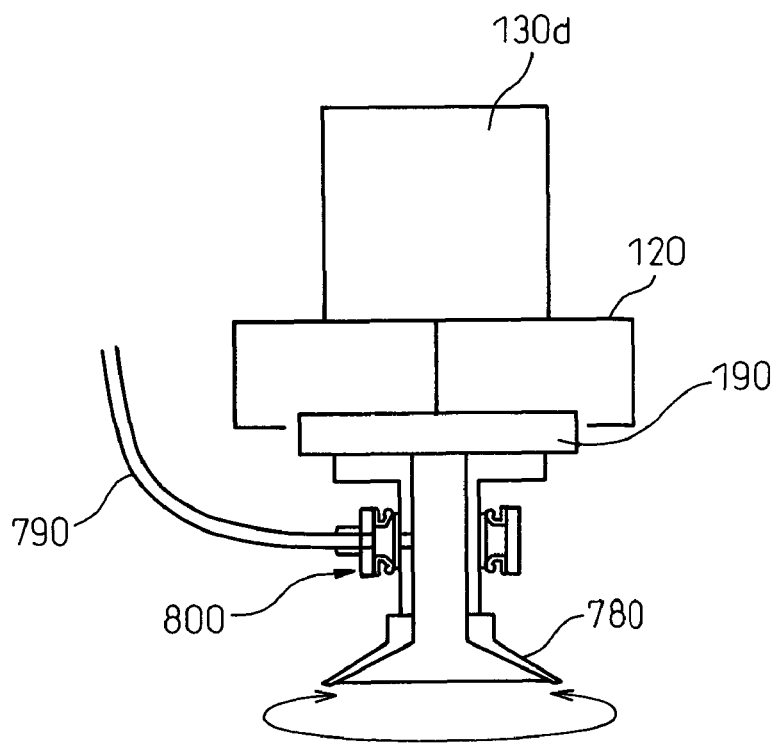
FIG. 16B is a partial cross-sectional view of the parallel link robot shown in FIG. 16A.

FIG. 5 is a schematic view showing a posture changing mechanism for transmitting rotational drive force input to the movable plate to the mounting member when increasing by a further one the degrees of freedom compared with the configuration shown in FIG. 11. That is, FIG. 5 generally corresponds to the configuration shown in FIG. 1. In FIG. 5, the posture changing mechanism 15 is included in the movable plate 12. The posture changing mechanism 15 in FIG. 5 is mainly comprised of a helical gear 51 attached to the shaft 14 and a helical gear 5 attached to the shaft extending from the mounting member 19 and engaged with the helical gear 51.

Therefore, the rotational drive force of the additional actuator 13d is transmitted through the power transmission shaft 39 and shaft 14 to the posture changing mechanism 15. Further, the posture changing mechanism 15 uses the transmitted rotational drive force to turn the mounting member 19 in the arrow direction. That is, in addition to the three degrees of freedom by the actuators 13a to 13c, the movable plate 12 of the parallel link robot 10 has a further degree of freedom because of the additional actuator 13d. Therefore, the end effector (not shown) of the parallel link robot 10 of the present invention can perform more complicated work.

Furthermore, in the present invention, as shown in FIG. 2, the additional actuator 13d is arranged between the two driven links 22b, 23b parallel to the same. Therefore, the operations of the link 20b provided with the driven links 21b and the other links 20a, 20c are not reduced in range by the additional actuator 13d. Further, the additional actuator 13d and its related members are not provided on the movable plate 12, so the acceleration/deceleration performance of the movable plate 12 is not impaired.

Further, in the present invention, the additional actuator 13d is not directly attached to the movable plate 12 and is arranged at a location relatively separated from the movable plate 12. For this reason, even when the parallel link robot 10 is used in an environment where a corrosive solution will splash on the moving parts, the corrosive solution will almost never reach the additional actuator 13d and therefore a protective cover for protecting the additional actuator 13d can be eliminated.

Figure 6:
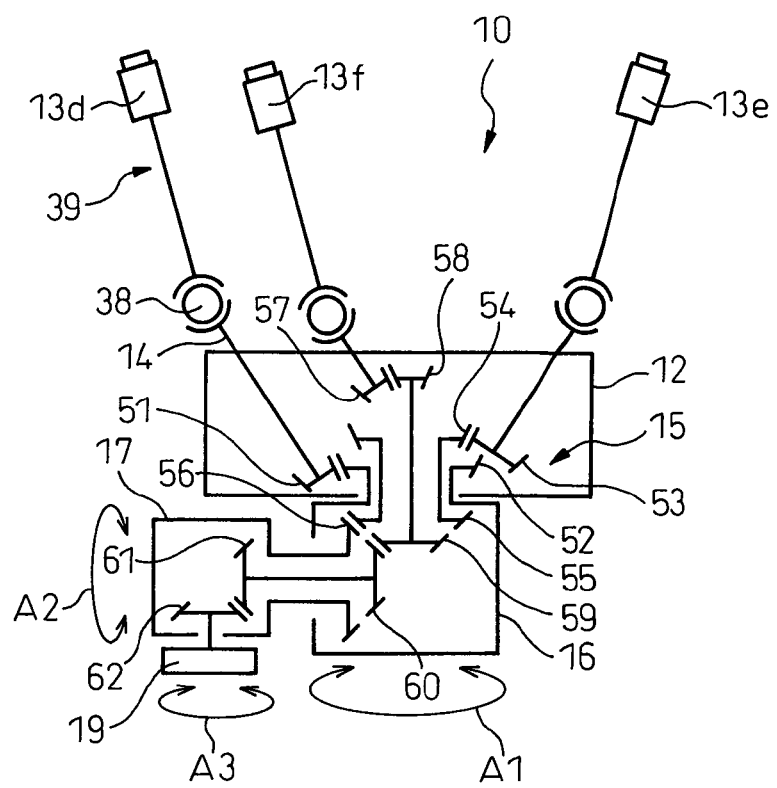
FIG. 6 is a schematic view of a posture changing mechanism transmitting rotational drive force input to the movable plate to the mounting member when further increasing by three the degrees of freedom compared with the configuration shown in FIG. 11.

FIG. 6 is a schematic view showing a posture changing mechanism transmitting rotational drive force input to the movable plate to the mounting member when further increasing by three the degrees of freedom compared with the configuration shown in FIG. 11. FIG. 6 shows, in addition to the additional actuator 13d, a further two additional actuators 13e, 13f. As explained with reference to FIG. 2, the actuator 13e is arranged between the driven links 22a, 23a in parallel to the same, while the actuator 13f is arranged between the driven links 22c, 23c in parallel to the same. Furthermore, the power transmission shaft and universal joint related to the additional actuators 13e, 13f are similar to the case of the additional actuator 13d, so explanations will be omitted.

In the embodiment shown in FIG. 6, the posture changing mechanism 15 is partially included in the movable plate 12. Further, at the bottom surface of the movable plate 12, a first wrist member 16 is attached in a rotatable manner. At one side of the first wrist member 16, a second wrist member 17 is attached in a rotatable manner. The mounting member 19 of the end effector (not shown) is attached to the bottom surface of the second wrist member 17 in a rotatable manner.

As shown in FIG. 6, a helical gear 52 operates integrally with the first wrist member 16. A helical gear 53 associated with the additional actuator 13e engages with a helical gear 54 rotating about the axis of rotation of the first wrist member 16. Further, a helical gear 55 positioned at the opposite side of the helical gear 54 engages with a helical gear 56 rotating integrally with the second wrist member 17.

Furthermore, as shown in FIG. 6, a helical gear 57 associated with the actuator 13f engages with a helical gear 58 rotating about the axis of rotation of the first wrist member 16. Further, a helical gear 59 positioned at the opposite side to the helical gear 58 engages with the helical gear 60 rotating about the axis of rotation of the second wrist member. Further, a helical gear 61 positioned at the opposite side to the helical gear 60 engages with a helical gear 62 rotating integrally with the mounting member 19. Such a structure is known, so a detailed explanation will be omitted.

In the embodiment shown in FIG. 6, the rotational drive force of the additional actuator 13d is transmitted through the power transmission shaft 39 and shaft 14 to the helical gears 51, 52 to make the first wrist member 16 rotate in an arrow A1 direction. Further, the rotational drive force of the additional actuator 13e is transmitted through the corresponding power transmission parts etc. to the helical gears 53, 54, 55, 56 to make the second wrist member 17 rotate in an arrow A2 direction. Furthermore, the rotational power of the actuator 13f is transmitted through the corresponding power transmission parts etc. to the helical gears 57, 58, 59, 60, 61, 62 to make the mounting member 19 rotate in an arrow A3 direction.

Therefore, the movable plate 12 of the parallel link robot 10 in the embodiment shown in FIG. 6 has, in addition to the three degrees of freedom by the actuators 13a to 13c, a further three degrees of freedom by the additional actuators 13d to 13f. Therefore, the end effector (not shown) of the parallel link robot 10 of the present invention can perform more complicated work.

In the configuration shown in the above-mentioned FIG. 11, only the simple work of lifting up a part placed on a horizontal surface and moving it to another location was performed, but in the configuration shown in FIG. 6, the complicated work of standing up a part, assembling it at a slant, or inserting it while twisting it becomes possible. Furthermore, in the embodiment shown in FIG. 6 as well, it is clear that the above-mentioned effect can be obtained. Further, the rotating axis of the first wrist member 16 and mounting member 19 and the rotating axis of the second wrist member 17 do not have to perpendicularly intersect. Even cases of an angle of other than 90 degrees are included in the scope of the present invention. Note that, only naturally, even a configuration eliminating the second wrist member 17 and additional actuator 13f is clearly included in the scope of the present invention.

Figure 7:
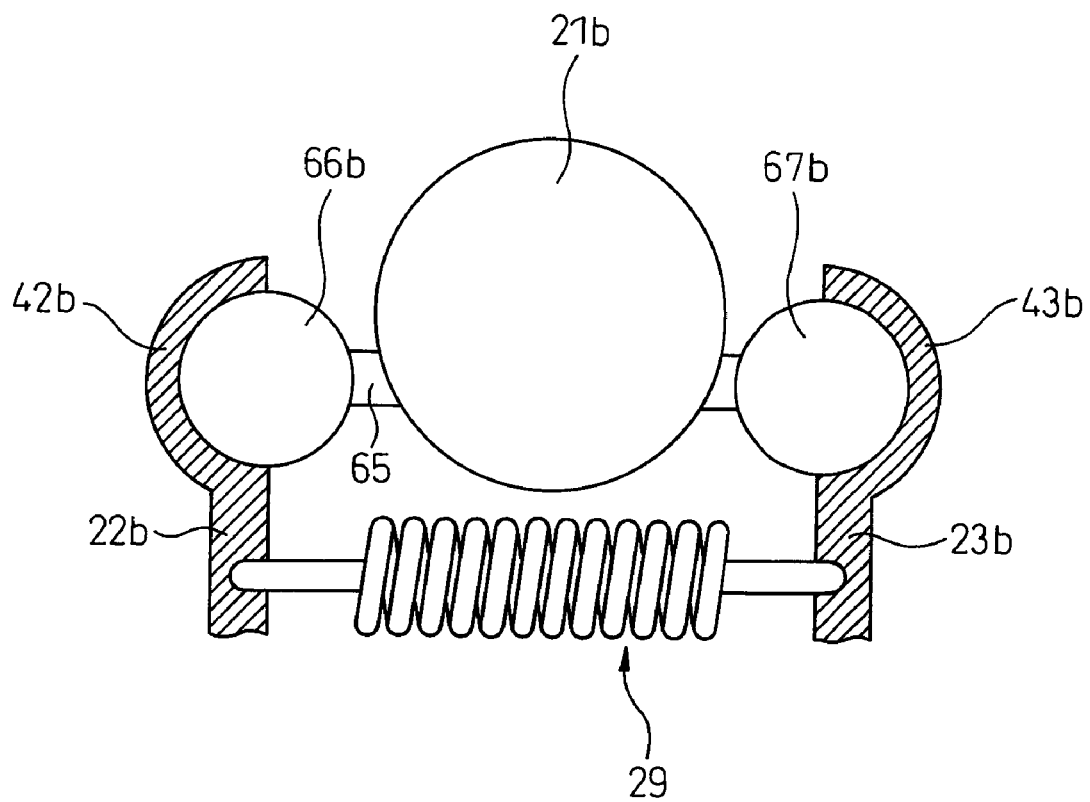
FIG. 7 is an enlarged view showing details of a spherical bearing arranged at the front end of a driven link.

In this regard, FIG. 7 is an enlarged view showing details of the spherical bearings arranged at the front ends of the driven links. In FIG. 7 and the later mentioned FIG. 8, the driven links 22b, 23b are shown representatively, but the other driven links 22a, 23a, 22c, 23c are also similar. In FIG. 7, a through rod 65 passes through the driven link 21b, and the two ends 66b, 67b of the through rod 65 are formed spherically. The two ends 66b, 67b of the through rod 65 are respectively housed in the spherical bearings 42b, 43b of the driven links 22b, 23b.

Furthermore, in FIG. 7, the two driven links 22b, 23b are pulled together by a spring 29. Therefore, at the time of operation of the parallel link robot 10, the driven link 21b will never detach from the driven links 22b, 23b. Further, when an operational mistake etc. causes the movable plate 12 to strike surrounding equipment etc., the two ends 66b, 67b of the through rod 65 will easily detach from the spherical bearings 42b, 43b so that the driven links 21b and the driven links 22b, 23b separate from each other. Therefore, these driven links 21b and driven links 22b, 23b can be prevented from being damaged.

Figure 8A:
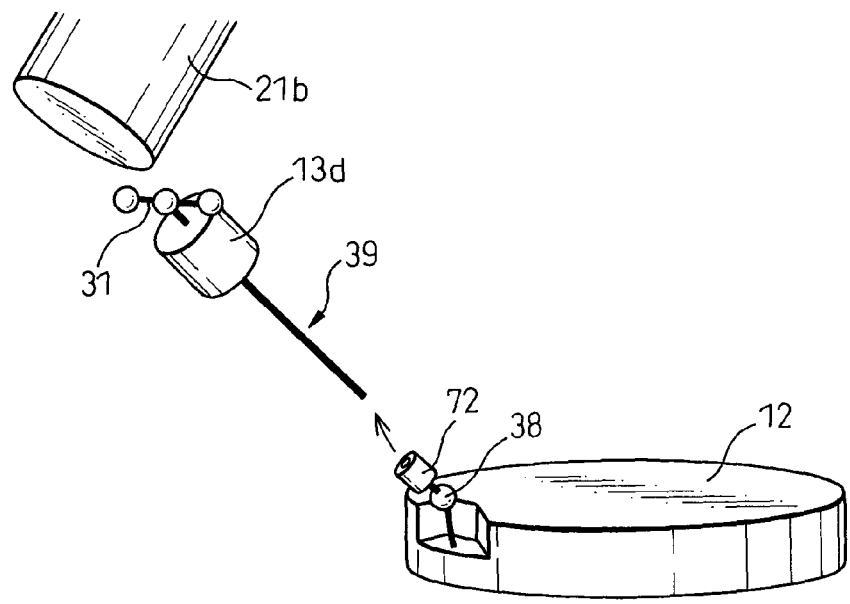
FIG. 8A is a partial disassembled perspective view of a parallel link robot.

FIG. 8A is a partial disassembled perspective view of a parallel link robot. In FIG. 8A, the power transmission shaft 39 includes an outside tube 72. Part of the power transmission shaft 39 is inserted as an inside tube 71 into the outside tube 72. As shown in a first enlarged view of the power transmission shaft, that is, FIG. 8B, the front end of the inside tube 71 is provided with a key 73 extending in the axial direction. In the bore of the outside tube 72, a key groove 74 corresponding to the key 73 is formed. Therefore, even in a case of inserting the inside tube 71 in the outside tube 72, the inside tube 71 and outside tube 72 will not rotate with respect to each other in the circumferential direction and the rotational drive force of the additional actuator 13d can be suitably transmitted to the posture changing mechanism 15.

Further, when operational mistakes etc. result in the movable plate 12 striking the surrounding equipment and the driven links 21b and the driven links 22b, 23b separating from each other, the inside tube 71 of the power transmission shaft 39 can easily detach from the outside tube 72 in the axial direction. Due to this, the power transmission shaft 39 can be prevented from being critically damaged.

Figure 8B:
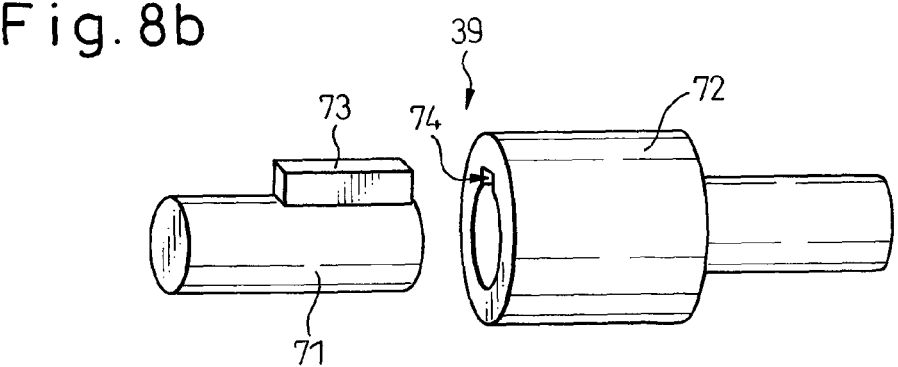
FIG. 8B is a first enlarged view of a power transmission shaft.
Figure 8C:
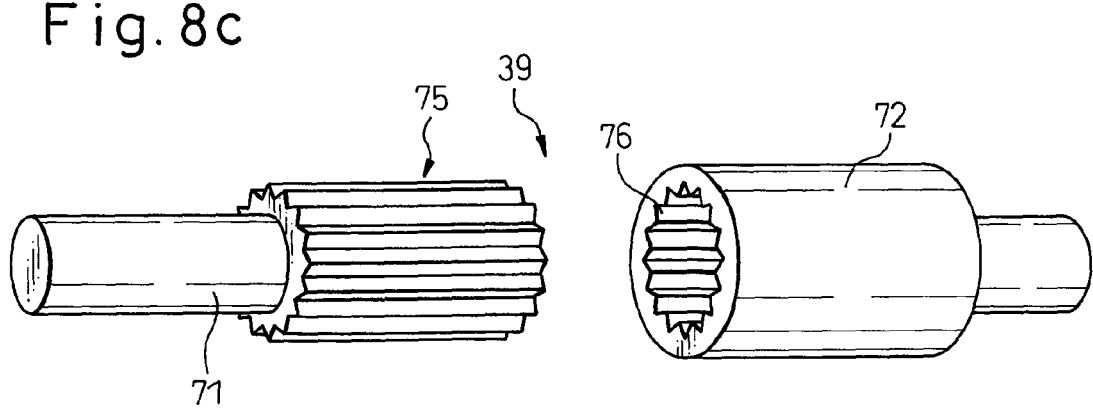
FIG. 8C is a second enlarged view of a power transmission shaft.

FIG. 8C is a second enlarged view of the power transmission shaft. In FIG. 8C, the front end of the inside tube 71 of the power transmission shaft 39 is formed as a spline shaft 75. Further, the outside tube 72 is formed with a spline hole 76 corresponding to the spline shaft 75. In such a case as well, it will be understood that the inside tube 71 of the power transmission shaft 39 can easily detach from the outside tube 72 in the axial direction and the power transmission shaft 39 can be prevented from being critically damaged.

Note that, in addition to the key 73 and spline shaft 75 shown in FIG. 8B and FIG. 8C, it is possible to employ a structure restricting the inside tube 71 and outside tube 72 from relative rotation and enabling the inside tube 71 and outside tube 72 to freely slide in the axial direction. This case as well is included in the scope of the present invention.

Figure 9A:
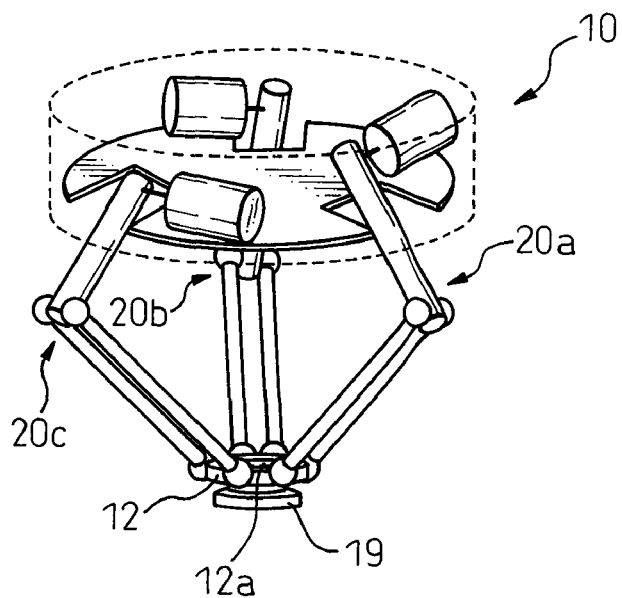
Figure 9B:
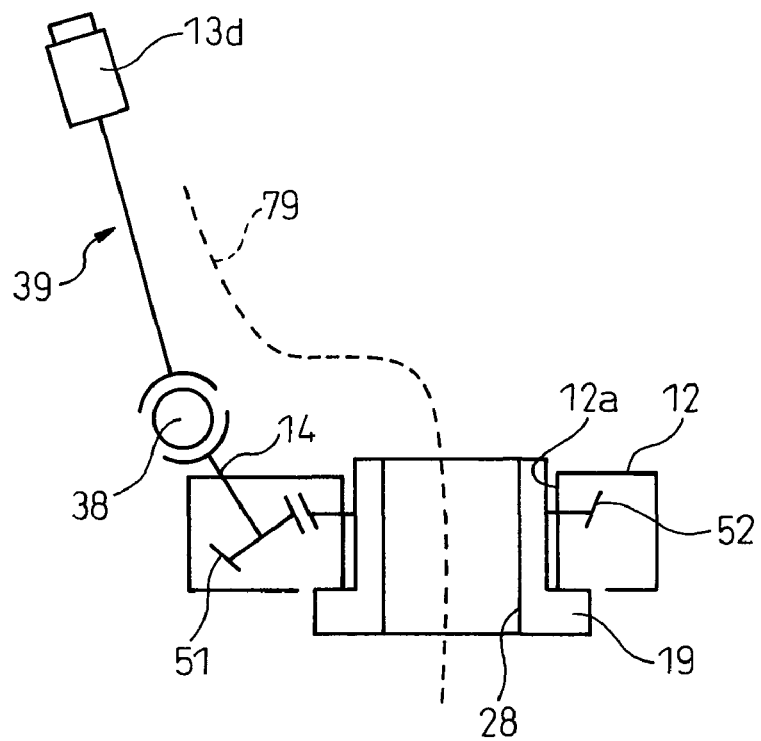
FIG. 9B is a partial cross-sectional view of the parallel link robot shown in FIG. 9A.

FIG. 9A is a perspective view of a parallel link robot in another embodiment of the present invention, while FIG. 9B is a partial cross-sectional view of the parallel link robot shown in FIG. 9A. In FIG. 9A and the later mentioned FIG. 10A, for simplification, the additional actuator 13d and its related members are omitted. As shown in FIG. 9A and FIG. 9B, the movable plate 12 is formed with a through hole 12a running from its top surface to bottom surface. Further, in the through hole 12a of the movable plate 12, the mounting member 19 is rotatably inserted. Note that, as can be seen from FIG. 9B, the mounting member 19 rotates integrally with the helical gear 52.

As shown in FIG. 9B, the mounting member 19 is also formed with a through hole 28 coaxial with the through hole 12a. Further, the piping used for the end effector, for example, the air tube 79, is inserted in the through hole 28 of the mounting member 19. The air tube 79 performs the function of imparting a suction force to the suction pad when the end effector is a suction pad. Note that, the end effector is not limited to a suction pad. Further, in addition to the air tube 79, an electrical cable may be inserted into the through hole 28 of the mounting member 19. Therefore, even when the additional actuator 13d etc. is driven, the air tube 79 and/or electrical cable can be prevented from being wound around the other members, for example, the end effector attached to the mounting member 19. Note that, in the case shown in FIG. 9B, rotation of the mounting member 19 is absorbed by torsion of the air tube 79 and/or electrical cable.

Figure 10A:
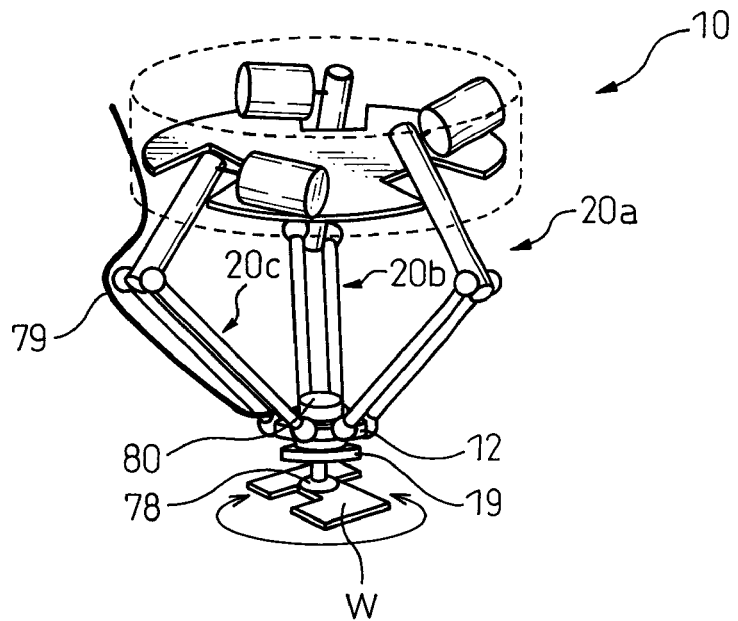
Figure 10B:
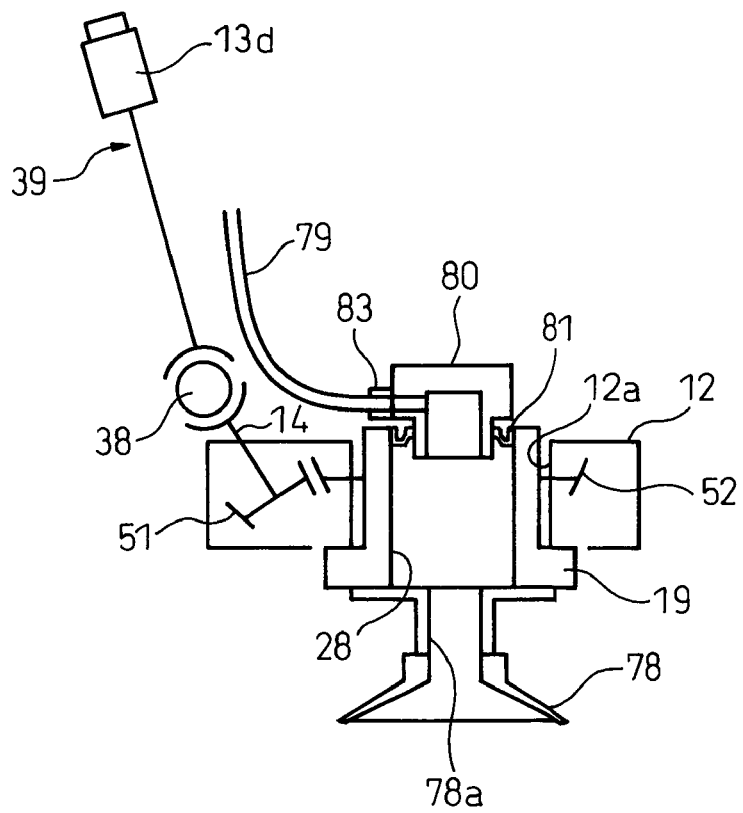
FIG. 10B is a partial cross-sectional view of the parallel link robot shown in FIG. 10A.

FIG. 10A is a perspective view of a parallel link robot in still another embodiment of the present invention, while FIG. 10B is a partial cross-sectional view of the parallel link robot shown in FIG. 10A. In these drawings as well, the mounting member 19 provided with the through hole 28 is inserted in the through hole 12a of the movable plate 12. Further, at the bottom end of the mounting member 19, the suction pad 78 is attached as an end effector.

Furthermore, in the through hole 28 at the top end side of the mounting member 19, the rotation absorption unit 80 is attached. As can be seen from FIG. 10B, the rotation absorption unit 80 is attached to the through hole 28 via a rotational seal 81, so the rotation absorption unit 80 can rotate in the through hole 28 of the mounting member 19. Further, at the part of the rotation absorption unit 80 sticking out from the mounting member 19, the air tube 79 of the suction pad 78 is connected through a joint 83.

As shown in FIG. 10B, the top end of the rotation absorption unit 80 is closed, so the air tube 79 is communicated with the suction pad 78 through the rotation absorption unit 80 and the mounting member 19. Therefore, the air tube 79 can give suction force to the suction pad 78 without loss. Further, since the rotation absorption unit is provided, in the embodiment shown in FIG. 10B as well, it will be understood that at the time of driving the additional actuator 13d etc., the air tube 79 can be prevented from being wound around other members, for example, the end effector. Further, in the case shown in FIG. 10B, the air tube 79 is not twisted, so the air tube can be used for a longer time compared with the case shown in FIG. 9B.

Furthermore, in FIG. 10A and FIG. 10B, the rotation absorption unit 80 is arranged above the movable plate 12 and mounting member 19. In other words, the rotation absorption unit 80 does not have to be arranged between the mounting member 19 and the suction pad 78. Therefore, in the embodiment shown in FIG. 10B, the distance between the mounting member 19 and the suction pad 78 does not have to be made longer. As a result, it is possible to make the tubular part 78a of the suction pad 78 relatively short. For this reason, it will be understood that the suction pad 78 can be prevented from interfering with the workpiece W (see FIG. 10A).

EFFECT OF THE INVENTION

That is, in the first aspect of the invention, it is possible to add additional actuators up to the same number as the links, so it is possible to increase the degrees of freedom of the parallel link robot. Therefore, in the configuration shown in FIG. 9, only the simple work of lifting up a part placed on a horizontal surface and moving it to another location could be performed, but in the first aspect of the invention, the complicated work of standing up a part, assembling it at a slant, or inserting it while twisting it becomes possible.

Furthermore, since the additional actuator is arranged between the two driven links in parallel with the same, the operations of the link provided with these driven links and the other links are not reduced in range by the additional actuator. Further, the additional actuator and its related members are not arranged directly at the moving part, so the acceleration/deceleration performance of the moving part will not be impaired. Further, the additional actuator can be arranged at a location away from the moving part, so it is possible to eliminate the protective cover protecting the additional actuator even in an environment in which a corrosive solution will splash on the moving part.

In the second aspect of the invention, the piping and wiring for the end effector to be attached to an element attached to a moving part can be passed through the through hole. Therefore, a rotation absorption unit does not have to be provided at the end effector, for example, the suction pad, at the outer circumferential surface of the tubular part. For this reason, the distance between the element attached to the moving part and the end effector can be made shorter and the end effector can be prevented from interfering with the workpiece. Further, the piping and wiring can be passed through the through hole, so at the time of driving, the piping and wiring can be prevented from being wound around other members, for example, the end effector.

That is, in the third aspect of the invention, even if some sort of reason causes the driven links to detach from the drive link, the inside tube of the power transmission shaft will detach from the outside tube in the axial direction, so the power transmission shaft can be prevented from being critically damaged.

That is, in the fourth aspect of the invention, even if some sort of reason causes the driven links to detach from the drive link, the inside tube of the power transmission shaft will detach from the outside tube in the axial direction, so the power transmission shaft can be prevented from being critically damaged.

That is, in the fifth aspect of the invention, it is possible to reduce the need for protecting the additional actuator in an environment where a corrosive solution will splash the moving parts.

Although the invention has been shown and described with exemplary embodiments thereof, it should be understood by those skilled in the art that the foregoing and various other changes, omissions and additions may be made therein and thereto without departing from the scope of the invention.

The invention claimed is:

1. A parallel link robot, comprising:
   a base,
   a moving part,
   three links coupling said base and said moving part and having respectively single degrees of freedom with respect to said base, and
   three actuators respectively driving said links,
   each of said links comprising a drive link coupled with said base and two driven links coupling said drive link and said moving part and parallel to each other,
   said parallel link robot further comprising:
   a posture changing mechanism for changing a posture of an element attached to said moving part,
   an additional actuator arranged between said two driven links of at least one of the three links, the additional actuator positioned in parallel to these driven links, and
   a power transmission shaft which extends coaxially from said additional actuator for transmitting rotational drive force of said additional actuator to said posture changing mechanism;

wherein the power transmission shaft is connected to a shaft extending from the posture changing mechanism through a universal joint, and the universal join is positioned on a line segment connecting two points of intersection between the two driven links and the moving part.

2. A parallel link robot as set forth in claim 1, wherein at least part of said power transmission shaft includes an inside tube provided with a key and an outside tube formed with a key groove corresponding to said key.

3. A parallel link robot as set forth in claim 1, wherein at least part of said power transmission shaft includes an inside tube provided with a spline shaft and an outside tube formed with a spline hole corresponding to said spline shaft.

4. A parallel link robot as set forth in claim 1, wherein said additional actuator is arranged adjacent to said drive link.

5. A parallel link robot, comprising:
a base,
a moving part,
three links coupling said base and said moving part and having respectively single degrees of freedom with respect to said base, and
three actuators respectively driving said links,
each of said links comprised of a drive link coupled with said base and two driven links coupling said drive link and said moving part and parallel to each other,
said parallel link robot further comprising:
a posture changing mechanism for changing a posture of an element attached to said moving part,
an additional actuator arranged between said two driven links of at least one of the three links, the additional actuator positioned in parallel to these driven links, and
a power transmission shaft which extends coaxially from said additional actuator for transmitting rotational drive force of said additional actuator to said posture changing mechanism;
wherein the power transmission shaft is connected to a shaft extending from the posture changing mechanism through a universal joint, and the universal joint is positioned on a line segment connecting two points of intersection between the two driven links and the moving part;
said posture changing mechanism being formed with a through hole running from its top surface to its bottom surface.

6. A parallel link robot as set forth in claim 5, wherein at least part of said power transmission shaft includes an inside tube provided with a key and an outside tube formed with a key groove corresponding to said key.

7. A parallel link robot as set forth in claim 5, wherein at least part of said power transmission shaft includes an inside tube provided with a spline shaft and an outside tube formed with a spline hole corresponding to said spline shaft.

8. A parallel link robot as set forth in claim 5, wherein said additional actuator is arranged adjacent to said drive link.

\* \* \* \* \*